United States Patent [19]
Haimer

[11] Patent Number: 5,622,037
[45] Date of Patent: Apr. 22, 1997

[54] DEVICE FOR PELLETIZING VEGETABLE MATERIAL

[76] Inventor: Franz Haimer, Weiherstrasse 21, 8894 Igenhausen, Germany

[21] Appl. No.: 285,225

[22] Filed: Aug. 3, 1994

Related U.S. Application Data

[63] Continuation of PCT/EP93/00990 Apr. 23, 1993.

[30] Foreign Application Priority Data

| Apr. 29, 1992 | [DE] | Germany | 42 14 111.7 |
| Aug. 22, 1992 | [DE] | Germany | 42 27 928.3 |
| Jan. 29, 1993 | [DE] | Germany | 9301258 U |
| Mar. 29, 1993 | [DE] | Germany | 9304636 U |

[51] Int. Cl.⁶ .................................................. A01F 29/00
[52] U.S. Cl. ........................... 56/16.4 D; 56/DIG. 1
[58] Field of Search .......................... 56/16.4 D, 16.4 B, 56/16.4 C, 16.4 R, DIG. 1, DIG. 5

[56] References Cited

U.S. PATENT DOCUMENTS

| 3,192,881 | 7/1965 | Lundell . |
| 3,230,903 | 1/1966 | Peterson et al. ............ 56/16.4 D |
| 3,517,488 | 6/1970 | Lundell ........................ 56/16.4 D |
| 3,859,026 | 1/1975 | Osborn . |
| 4,824,352 | 4/1989 | Hadley et al. . |
| 5,156,570 | 10/1992 | Justice, III .................. 56/12.2 X |

FOREIGN PATENT DOCUMENTS

| 1371346 | 7/1964 | France . |
| 144230 | 10/1980 | German Dem. Rep. . |
| 317814 | 10/1917 | Germany . |
| 564638 | 12/1931 | Germany . |
| 971550 | 6/1954 | Germany . |
| 1208936 | 1/1966 | Germany . |
| 1215997 | 5/1966 | Germany . |
| 2151865 | 8/1972 | Germany . |
| 7244248.9 | 11/1972 | Germany . |
| 3233121 | 3/1984 | Germany . |
| 3831528 | 3/1990 | Germany . |
| 60-051788 | 3/1985 | Japan . |
| 846303 | 7/1981 | U.S.S.R. . |
| 1159639 | 6/1985 | U.S.S.R. . |
| 1440739 | 11/1988 | U.S.S.R. . |
| 339868 | 12/1930 | United Kingdom . |
| 380987 | 9/1932 | United Kingdom . |

Primary Examiner—Terry Lee Melius
Attorney, Agent, or Firm—McGlew and Tuttle, P.C.

[57] ABSTRACT

A pressing or pelletizing device for compacting vegetable materials, in particular grass blades, is disclosed for use with a harvester. In order to reduce the pressing forces required for the pelletizing process, the pressing channels are heated up to a temperature above 100 degrees C. It has been demonstrated that by heating the pressing channels, local overheating of the device, which could otherwise lead to malfunctions, can be avoided. The pelletizing device has two co-axial hollow cylinders in which the pressing channels are delimited by radial lands which alternatively engage the pressing channels of the other hollow cylinder. The hollow cylinders are heated by means of a liquid circuit guided through the lands and linked to a heat exchanger that utilizes lost heat from the internal combustion engine of the harvester.

45 Claims, 13 Drawing Sheets

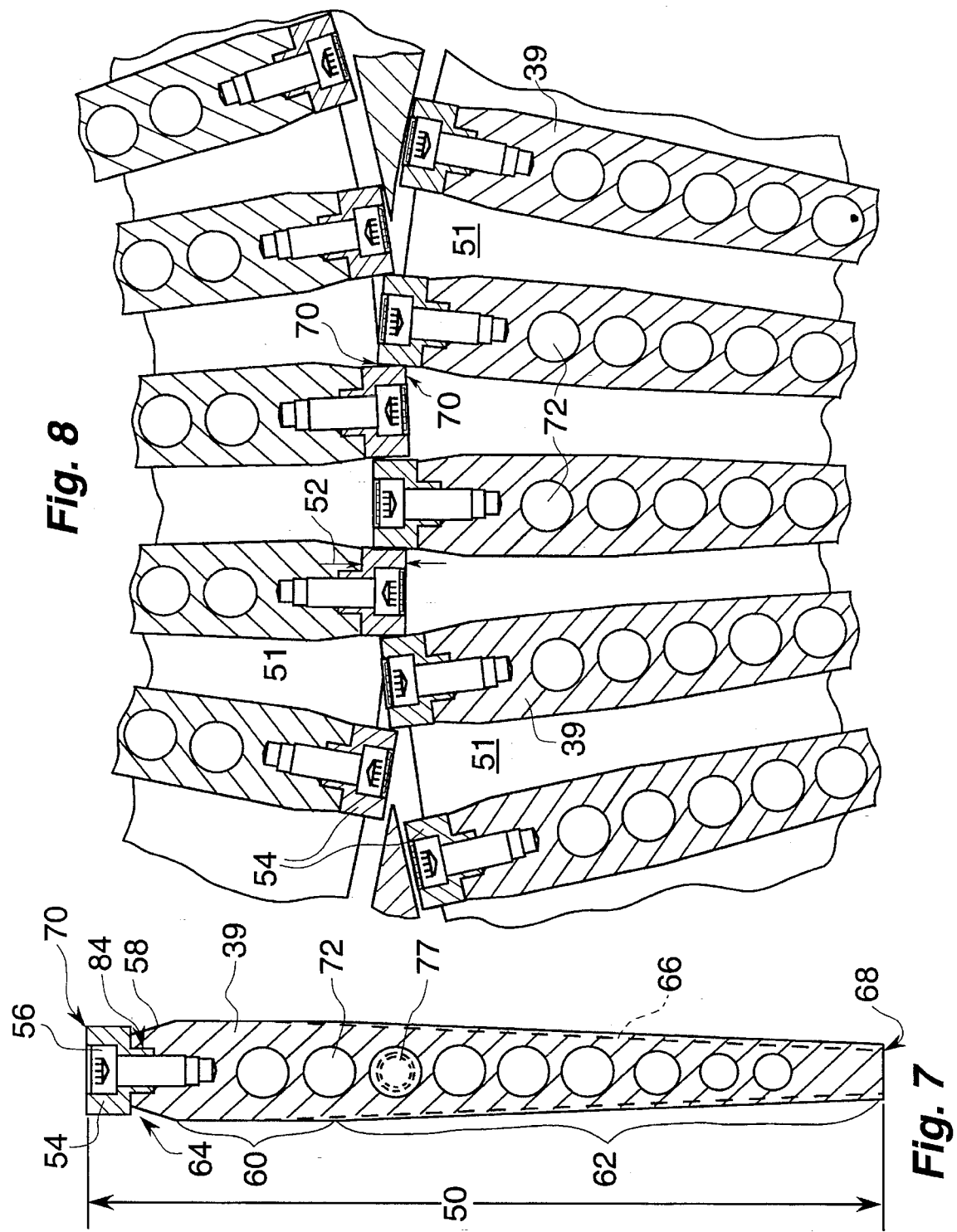

5,622,037

DEVICE FOR PELLETIZING VEGETABLE MATERIAL

CROSS REFERENCE TO RELATED APPLICATION

The present application is a continuation of copending application PCT/EP93/00990 filed Apr. 23, 1993.

FIELD OF THE INVENTION

The present invention pertains to a device for pelletizing vegetable material, especially straw material, into free-flowing pressed objects for preparing animal feeds, fuels for generating energy, or for further industrial processing.

BACKGROUND OF THE INVENTION

U.S. Pat. No. 4,824,352, discloses a pellet mill for processing coarse and long fibers, especially straw, into animal feed. The material is fed by a screw conveyor into an expanding hopper, which is arranged in the intake wedge of two hollow rolls, which are driven in a mechanically controlled manner and engage each other in the manner of toothed gears. A plurality of holes tapering in the radial direction lead from the root of the tooth into the interior of the hollow rolls. The teeth are elongated in the axial direction and roll on each other. The straw material introduced into the wedge area of the hollow rolls is compacted by the teeth penetrating into the gashes and it is pressed through the radial holes into strands, which break off in the hollow space of the hollow rolls and are removed axially from the hollow spaces.

Practical work with such pelletizing devices shows that trouble-free pressing of large amounts of straw material is problematic, because the straw material coils up around the teeth of the hollow bodies and accumulates in the root of the teeth by the radial holes, increasing resistance, so that the rotating bodies keep becoming blocked. Such devices are definitely unsuitable for preparing pressed objects of high density from straw material for use as a fuel material or for industrial purposes, because the frictional resistance of the meshing teeth as well as of the conical holes is too high, so that the energy needed to drive the hollow rolls increases excessively and cannot be ensured with the conventional means at all. In addition, the residues of straw material deposited on the hollow roll are heated up to pyrolysis temperatures due to the increased compression action, and the carbonized residues thus formed also lead to breakdown of the pelletizing device in a short time.

SUMMARY AND OBJECTS OF THE INVENTION

The primary object of the present invention is therefore to improve the prior-art pelletizing device such that trouble-free pressing of straw material in continuous operation will be possible, and high throughput of straw material can also be achieved at a low drive output.

According to the invention, a device for pelletizing vegetable material is provided. The device includes hollow rolls mounted in parallel to one another which are forcibly driven in opposite directions in relation to one another and engage each other with teeth. Pressing channels are formed between the teeth which lead radially to the interior of the hollow rolls. Straw material is compacted through the radial pressing channels and is broken off in the material of the hollow rolls and is removed from the interior in an axial direction.

The teeth are formed of heatable webs elongated in the radial and axial directions. The teeth are connected to two flange bodies which are arranged coaxially and at spaced locations from one another to define therebetween a pressing chamber, the hollow rolls being surrounded by a housing.

Due to the teeth being designed as webs elongated in the radial and axial directions, between which radial shafts acting as pressing channels are located, material that is in the pressing process is prevented from accumulating and from leading to blockage.

Due to the axial extension of the webs and consequently of the pressing channels located between them as well, the said pressing channels have a narrow shape elongated in the axial direction, which leads to relatively wide and thin strands containing the pressed material being able to be formed corresponding to this shape, as a result of which a high throughput of material per unit of time can be achieved. The radial top view of the pressing channels is normally rectangular. However, if the thickness of the webs is made variable, e.g., crowned, in the axial direction, pressing channels with bulged cross section will be formed.

In conjunction with the heating of the teeth, the radial extension of the teeth according to the present invention offers the advantage that the pressed material located in the shafts can remain exposed to the action of heat and pressure for a certain amount of time, which leads to a certain hardening and dimensional stability. The density of the pressed objects can thus be increased to the desired extent, and the pressed object can be used as a free-flowing fuel material or as a starting product for further industrial processing.

Even though heating of the feeding and pressing members of a pellet mill has been known from U.S. Pat. No. 3,192,881, the compaction process applied is based on the application of centrifugal force and is unable to accomplish the task of the present invention. In particular, it is impossible to prepare pressed objects of high density.

Furthermore, surrounding hollow rolls of a pelletizing device, whose rolls mesh in the manner of teeth, with a housing has been known from FR-A-1,371,346, in which case bulk material is claimed to be processed for pharmaceutical purposes, fertilizers or ceramic or mineral products. Aside from the fact that these applications belong to a different class, compaction in this prior-art system is also based on teeth rolling on one another, at the root of which radially extending holes acting as compaction channels are arranged. Nevertheless, it is still unable to accomplish the task of the present invention.

In contrast, the webs in the object of the present invention do not roll on one another, and also do not touch each other during their penetration into the shafts located between the webs of the other hollow body. The edges of the webs pass by each other at a short distance only, which leads to shearing off of the straw material fed in forcibly by a pressure worm. Since only the shafts passing through radially are located between the webs, and no tooth root with a hole located in it is consequently provided, accumulation of the straw material being pressed, which tends to undergo carbonization, cannot occur, either.

The essential advantage of the device according to the present invention is its high performance and efficiency, because very large amounts of material can be pressed per unit of time at a relatively low energy consumption.

The hollow rolls include webs detachably connected to flange bodies. The webs have axially parallel holes for connection to heating medium lines. The housing surrounds the hollow rolls and is preferably designed as a heatable housing particularly with holes for connection to heating medium lines.

The arrangement of the pelletizing device on a harvester such as a self propelled harvester whereby vegetable material can be mowed, picked up, crushed, conveyed, pressed and stored and wherein the device housing can be heated by waste heat of an internal combustion engine of the harvester; offers the considerable advantage that the pelletization of straw material can be performed in one operation in the field during use for harvesting frown mowing to storing (e.g., in a silo) of the pressed pellets.

Even though a harvester with a mowing device for straw material (hay) and with a pickup device with forced feeding of the mown material via a feed screw to a pelletizing device, whose pressing tools were mentioned, has been known from the above-mentioned U.S. Pat. No. 3,192,881, the waste heat of the internal combustion engine is used to heat the feed means for the straw material, whereas a separate heat source must be installed for heating the pressing members of the pelletizing device.

In contrast, the webs according to the present invention are heated preferably by the exhaust gases of the internal combustion engine preferably to a temperature higher than 150° C. and especially 165° C. The straw material can be processed best when it has a moisture content of 16–18%. If the moisture content in the harvested material is lower than these values, it is advisable to add moisture to the straw material on its way to the pellet mill.

The geometry of the webs and shafts according to the present invention including providing the radial length of the webs substantially greater than the depth of penetration of the webs into the associated shaft, providing that the web front areas penetrate into the shafts in a contactless manner and providing an outer front area of the webs with a wear bar which is detachably connected provides additional advantages.

Other features of the webs including the shape of the webs offer the advantage that the compaction and the residence time of the straw material in the shafts can be performed in an optimized manner. What is achieved is first of all that the pressed material is exposed to a defined thermal action under reduced friction, and thus it acquires properties important for its use as a fuel. represented as examples in the drawings.

BRIEF DESCRIPTION OF THE DRAWINGS

In the Drawings:

FIG. 7 shows a radial longitudinal section through a web approximately in the actual size, FIG. 8 shows a radial longitudinal section through a plurality of webs located in different meshing positions.

DETAILED DESCRIPTION OF THE PREFERRED EMBODIMENT

Figure 1:
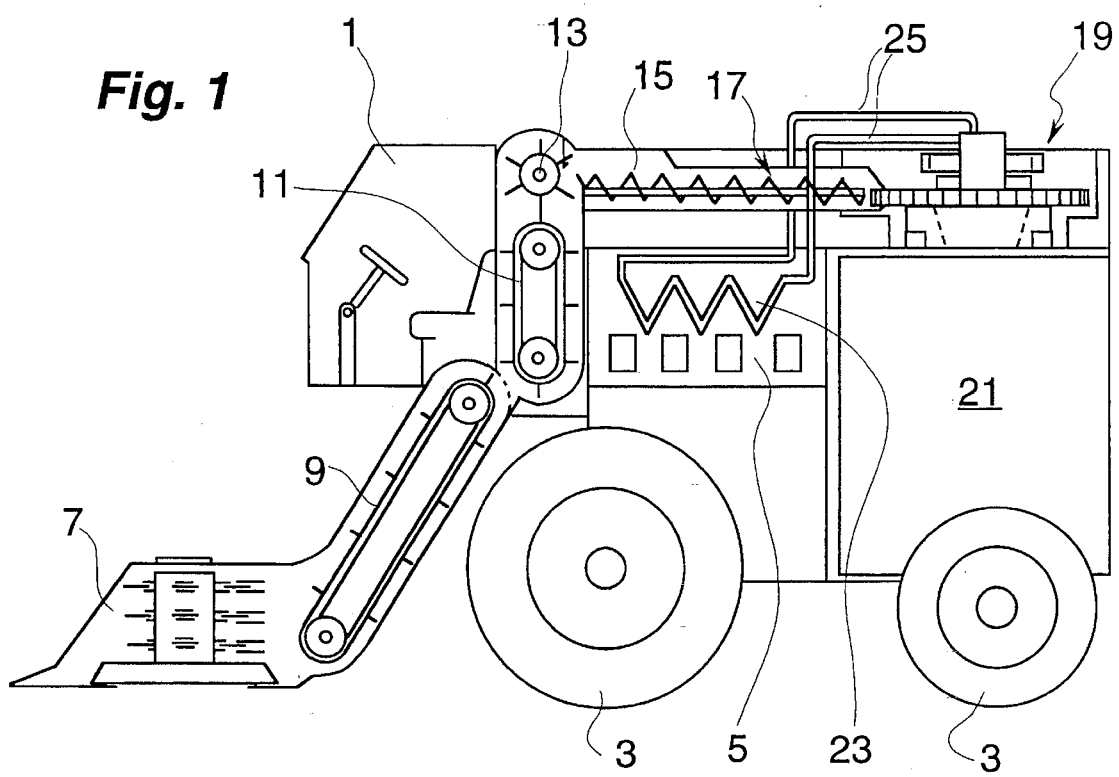
FIG. 1 shows a harvester with a pelletizing device according to the present invention.

FIG. 1 shows a self-propelled harvester, which can be steered from a driver's cabin (1), whose wheels (3) are driven by an internal combustion engine (5). At its front end, the harvester carries a mowing tool (7), e.g., a rotary mowing tool with coarse crushing devices, which cuts and crushes the straw material being harvested. A slope conveyor (9) transfers the coarsely crushed straw material to a vertical conveyor (11), which feeds it to a guide roller (13) of a fine crushing mechanism, which [guide roller] is arranged in the upper area of the harvester. The said guide roller (13) transfers the finely crushed straw material to a trough screw (15), which is joined by a pressure worm (17). The outlet of the said pressure worm (17) opens into a pelletizing device (19), which will be explained in greater detail below, and which compresses the straw material precompacted by the said pressure worm (17) into freeflowing pellets. The said pelletizing device (19) is arranged above a silo (21), which is arranged in the rear area of the harvester and receives the pellets.

The said pelletizing device (see FIGS. 2 and 3) comprises two pelletizing bodies, which are mounted in parallel to one another, are designed as hollow rolls (33), have webs and shafts engaging each other on their circumference, and are heated via a heating circuit by the waste heat of the said internal combustion engine (5) to at least 100° C., but preferably to a temperature higher than 150° C. The heating circuit comprises in this example a heat exchanger (23) connected to the coolant circuit of the said internal combustion engine, or it forms as such the coolant circuit and it is connected via connection lines (25) to heating agent channels of the pelletizing bodies, which will be explained in greater detail below. The waste heat of the said internal combustion engine (5) can thus be recovered, which considerably improves the overall efficiency of the harvester. The said internal combustion engine (5) drives not only the said wheels (3) of the harvester, but at least also the pelletizing bodies of the said pelletizing device (19) and, if desired, also the said rotary mowing tool (7), including the said conveyers (9) through (17).

A substantial increase in the efficiency of the entire unit is achieved when the exhaust gases of the said internal combustion engine (5) are used to heat the said pelletizing device. Without additional energy supply, it is thus possible to achieve heating of the pressing elements to ca. 165° C., which has proved to be optimal for the pressing operation.

It is therefore obvious that other heat exchangers may additionally be provided, if desired, to recover heat from other waste heat sources of the said internal combustion engine, in addition to or instead of the said heat exchanger (23) connected to the cooling circuit of the said internal combustion engine (5).

Figure 14:
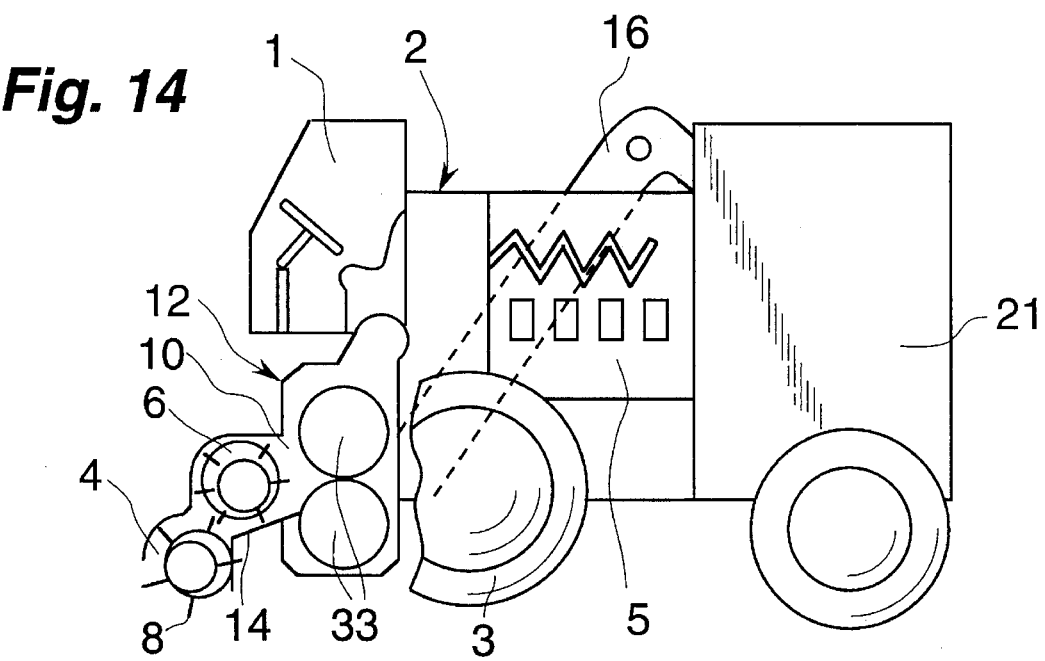
FIG. 14 shows a harvester as an alternative to FIG. 1.

FIG. 14 shows a harvester (2), which is an alternative to the said harvester shown in FIG. 1, and which can be steered from the said drive's cabin (1) and is driven by a said internal combustion engine (5). At its front end, the said harvester carries a pickup device (4) for straw material, a side feed screw (6), which is arranged at the top and is offset to the rear in the direction of travel and consists of a pipe with two worm brushes, which feed the material picked up to the middle. The material is grasped by controlled feed prongs (8) there, fed into the intake area (10) of a pressing device (12), and crushed at the cutting knives (14) extending into the feed path in the process.

Figure 5:
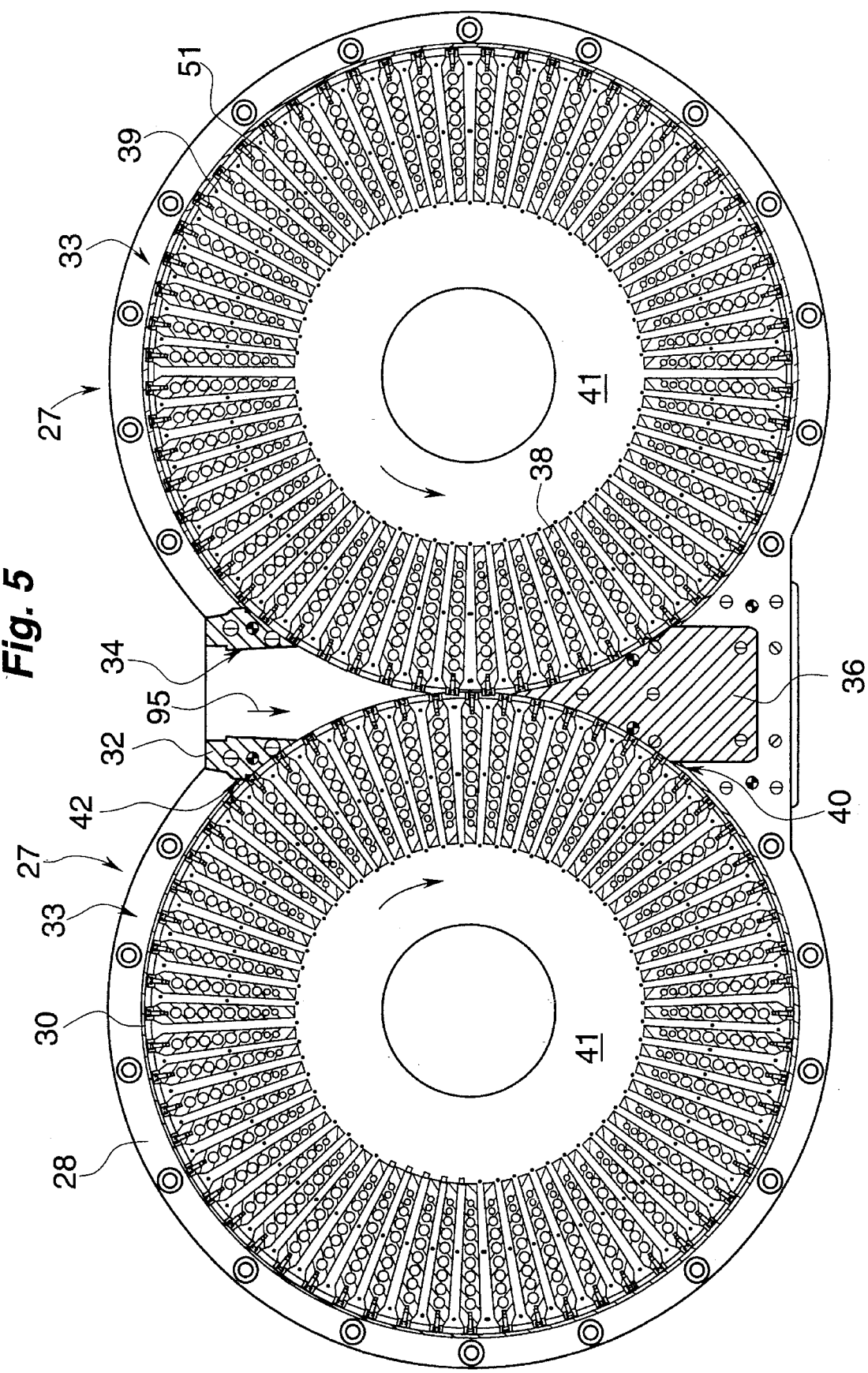
FIG. 5 shows a section corresponding to FIG. 2 through a preferred exemplary embodiment of the pelletizing device.

The use of a pelletizing device, consisting of two hollow rolls (33) arranged axially in parallel to one another (see FIG. 5), is schematically represented in the drawing as the said pressing device (12). However, it is also possible to use a screw-type compactor.

The pellets or pressed objects are fed with an elevator (16) into a said silo (21).

The arrangement of the pressing device directly behind a pick-up device or a mowing device for the material to be pressed is also of independent inventive significance if the pressing device is not designed as a replaceable structural unit, because it is advantageous for the work process to compact the material to be pressed immediately after pickup and thus to maintain a short feed path for the material of low density.

Figure 2:
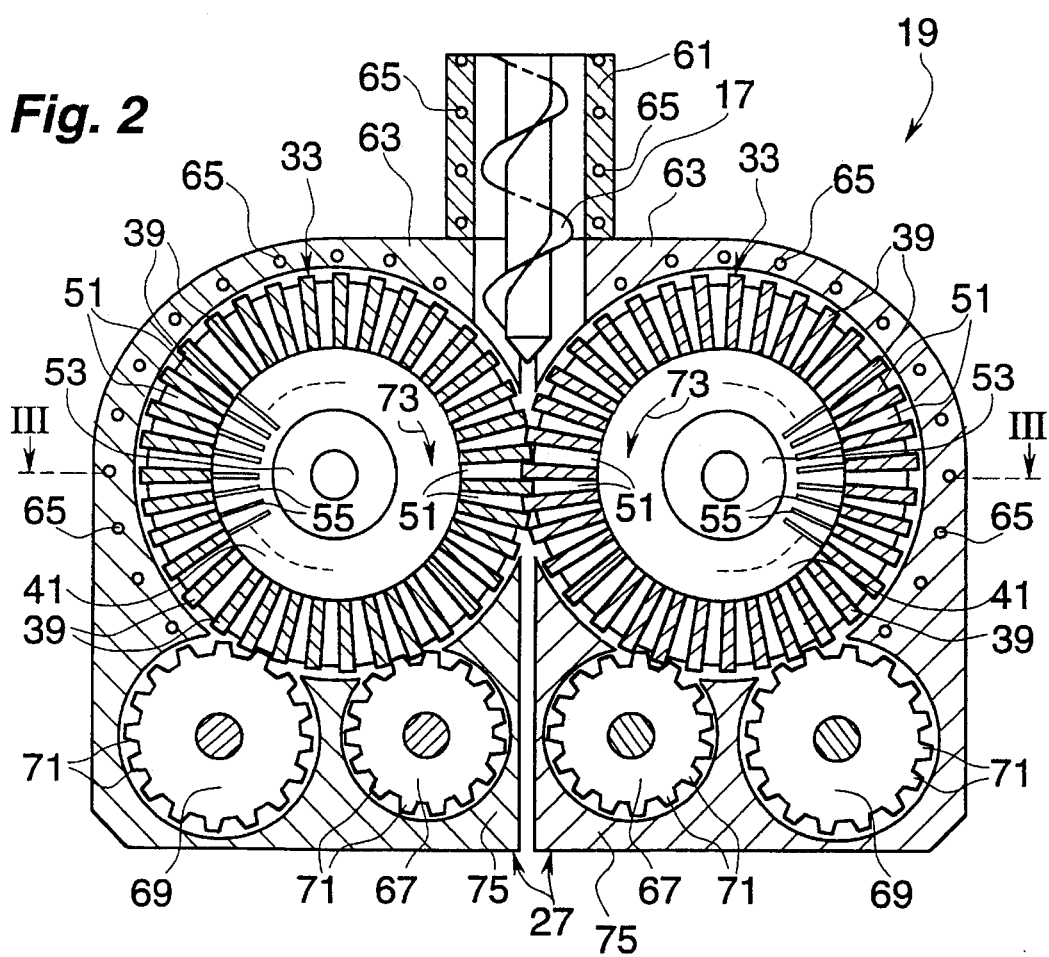
FIG. 2 shows a sectional view of the pelletizing device, viewed along a line II—II in FIG. 3.
Figure 3:
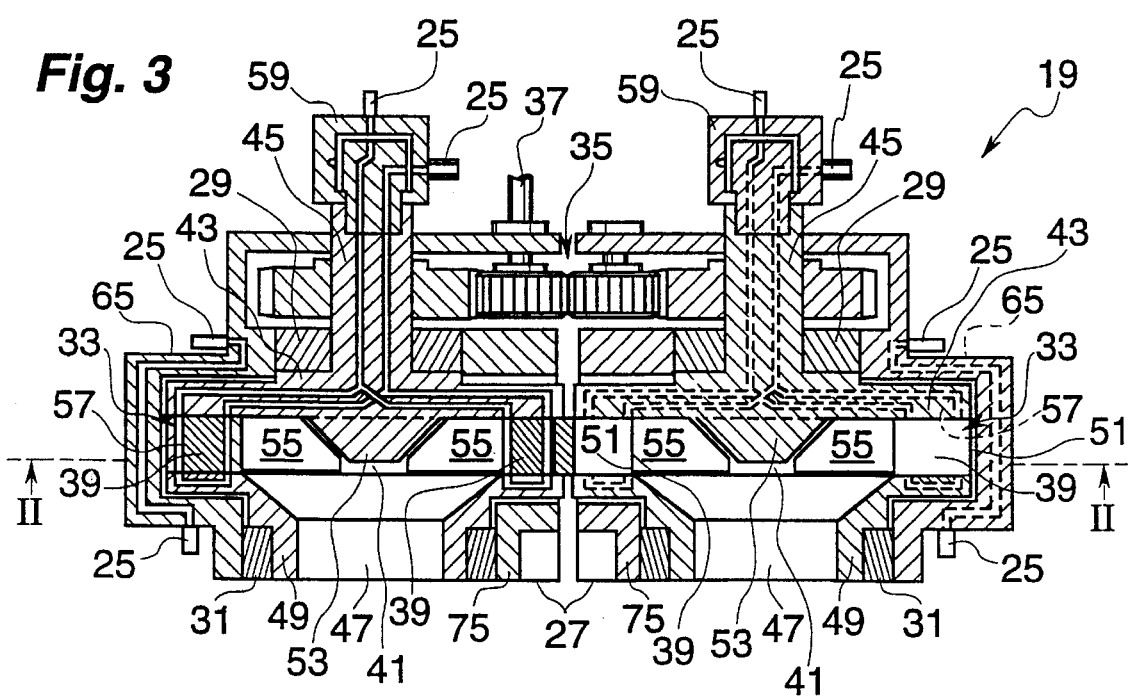
FIG. 3 shows a sectional view of the pelletizing device, viewed along a line III—III in FIG. 2.

FIGS. 2 and 3 show details of the said pelletizing device (19). The pelletizing bodies have the shape of two hollow rolls (33), which are mounted rotatably axially in parallel to one another in bearings (29, 31) in a housing (27), and which are driven by a drive shaft (37) via a gear mechanism (35) to rotate in opposite directions.

The hollow wheels (33) have a plurality of webs (39), which have a flat axial longitudinal section and enclose a hollow space (41). The said webs (39) are axially located, detachably fastened, between a plate-shaped flange body (43), which in turn is held on an axle journal (45) connected to the transmission (35), and, on the other hand, an annular flange body (49), which surrounds an outlet opening (47). In the circumferential direction, adjacent webs (39) define a pressing chamber (shaft) (51), which tapers approximately in a wedge-shaped pattern toward the hollow space (41) and passes through continuously from the outer circumference to the inner circumference of the circumferential wall. The radially outer end areas of the said webs (39) of the respective other hollow roll, acting as an extrusion die, engage the said shafts (51), which have an elongated rectangular cross section, while the said hollow rolls (33) rotate in opposite directions. Straw material forcibly fed into and crushed in the roll gap of the said hollow rolls (33) by the said pressure worm (17) is pressed into the said shafts (51) by the said webs (39), and it is compacted there. The dimension of the said webs (39) is selected to be such that they engage the said shafts (51) with a clearance, i.e., they do not touch each other, while the said hollow wheels (33) are forcibly driven via the said transmission (35) in relation to one another.

Centrally arranged crushing cones (53), which taper toward the said outlet opening (47) and crush the pressed strands leaving the said shafts (51) radially in the inward direction into pellets and deflect them to the said outlet opening (47), are seated inside the said hollow spaces (41), whose axial depth relative to the axial length of the said webs (39), is smaller than their internal diameter. This action is reinforced by radial guide plates (55) (FIG. 2), which extend the said webs (39) toward the said crushing cone (53). The said hollow rolls are arranged in this example with a said downwardly directed outlet opening (47), so that the crushed pellets can immediately fall into the said silo (21) (FIG. 1).

As is shown best by FIG. 3, the said webs (39) have heating agent channels (57), which are connected via the said flange body (43) and the said axle journal (45) to a rotary liquid coupling (59), to which the said heating agent lines (25) are connected. A liquid heat carrier medium, e.g., in the form of a heat-resistant oil or the like, which is heated by the said heat exchanger (23) of the said internal combustion engine (5) to at least 150° C., circulates in the said heating agent channels (57). Keeping the straw material to be pelletized at an increased temperature in the said shafts (51) reduces the drive output needed to drive the said hollow rolls (33) and reduces the pressure needed for compaction in the said shafts (51). It is obvious that a heat pump may be connected into the heating agent circuit, if desired, should the temperature level supplied by the said internal combustion engine (5) be too low. In addition to the said heating agent channels (57), additional heating agent channels (65) (FIG. 1), which are connected to the said heat exchanger (23), are also provided in the housing (61) of the said pressure worm (17) forming the feed path, as well as in the areas (63) of the said housing (27) which closely surround the said feed path. The said heating agent channels (65) in the said housing walls (63) or in the said housing pipe (61) may be omitted, if desired. If the heating capacity of the said heating agent channels (65) is sufficient in itself, the said heating agent channels (57) of the said hollow rolls (33) may possibly be omitted as well.

Two respective repressing rollers (67) and (69) mounted rotatably in the said housing (27) axially in parallel to the said hollow rolls (33) may be associated with each of the said two hollow rolls (33) in order to improve the pressing action. Contrary to the said hollow rolls (33), the said repressing rollers (67, 69) have only radially projecting dies (71), which engage the said shafts (51) of the said associated hollow roll (33). The said repressing rollers (67, 69) consecutively mesh with the said associated hollow roll (33), and the depth of penetration of the said dies (71) increases in the repressing rollers following each other in the direction of rotation (73) of the said hollow rolls. The different depth of penetration of the said dies (71) can be achieved by different die heights and/or a different axial distance between the said repressing rollers and the said hollow rolls. The said repressing rollers (67, 69) may be driven loosely by the meshing of the said dies (71); however, they may also be forcibly synchronized with the said transmission (35).

To make it possible to adjust the depth of penetration of the said webs (39) into the said shafts (51), the said housing (27) is divided, at right angles to the connection plane of the hollow roll axes, into two housing halves (75), on which one of the said hollow rolls (33) each, including the associated repressing rollers (67, 69), is mounted. The said housing halves (75) are adjustable in relation to one another in the direction of the connection plane of the axes. The adjusting movement is preferably performed around the axis of rotation of one of the gears of the said transmission (35) in order to maintain the meshing of the teeth independently from the adjusted position. It is obvious that other drive chains which ensure the forced engagement of the said hollow rolls, e.g., in the form of link chains or toothed belts, may be used as well.

The feed capacity of the said pressure worm (17) is preferably adjustable, e.g., by varying the worm speed, in order to ensure a uniform and optimal feeding of the said hollow rolls (33) with material to be pelletized. The worm speed is preferably maintained at a constant set value via a control loop depending on the drive output of the said hollow rolls (33).

A continuously variable, controllable transmission may be provided to adjust the worm speed. However, the feed capacity of the said pressure worm may also be varied in another manner, e.g., by using an axially adjustable conical worm in a conical housing.

It is obvious that heat sources other than the waste heat of the internal combustion engine of a harvester may also be used in the exemplary embodiments of the pelletizing devices and of the pressing device explained above. In addition, it should be pointed out that the mechanical design of the pelletizing devices according to FIGS. 2 and 3 may also be used, in a particular case, without heating devices for heating the pressing channels.

The exemplary embodiment according to FIGS. 5 through 11 shows a preferred design variant for the pelletizing device according to the present invention, whose individual features have arisen from practice and from the consistent improvement of the object of FIG. 2.

The said housing (27) of the pelletizing device has a housing frame (28) and a housing shell (30). The said housing shell (30) surrounds both said hollow bodies (33) with a substantially smaller clearance than is represented in FIG. 2. The material to be pelletized is force-fed in the crushed state into the wedge area of the said hollow rolls (33) via a housing connection (32). The said housing connection (32) has a hollow space (34) expanding in the shape of a wedge in the direction of feed. In the opposite wedge area, a wedge-shaped component (36) is connected to the said housing (28, 30), whose outer surface (38) is nearly in sliding friction with the outer front areas of the said webs (39).

It was found to be highly advantageous in practice for the said housing shell (30) not be located centrally to the axis of rotation of the said webs (39). If the clearance between the inner surface of the said housing shell (30) and the outer jacket areas of the said webs (39) is made variable, so that a minimum clearance (40) is set in the area of the contact point between the said webs (39) and the said wedge-shaped component (36), and a maximum clearance (42) is set at the transition of the said housing shell (30) to the said housing connection (32), the risk of blockage of the rotation of the said hollow bodies (33) in the said housing (28, 30) is eliminated. The difference in clearance is relatively small; favorable experience was achieved with a difference of 1 mm. However, the present invention is not limited to this measure.

Figure 4:
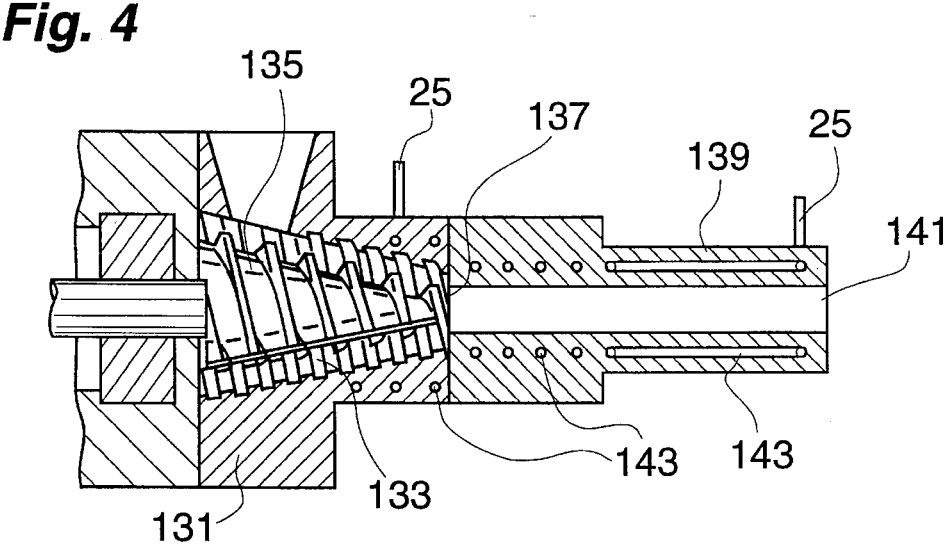
FIG. 4 shows a schematic representation of a pressing device for straw material, which can be used in a harvester according to FIG. 1.
Figure 6:
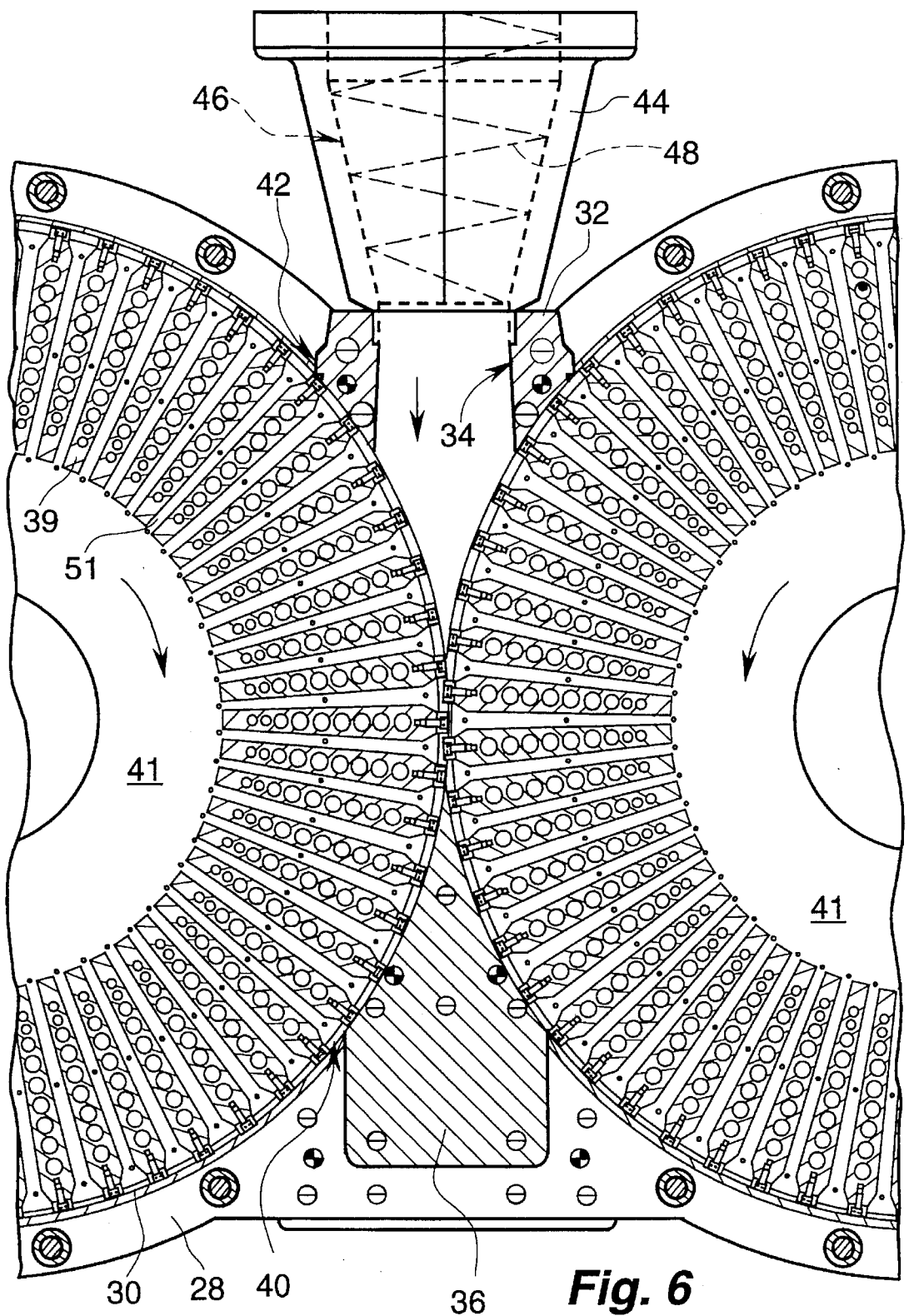
FIG. 6 shows a partial section corresponding to FIG. 5 on a larger scale.

The representation on a larger scale in FIG. 6 shows that a worm housing (44), which is formed of a hollow space (46) tapering in the direction of feed of the material to be pelletized, is located adjacent to the said housing connection (32). The said pressure worm (48) guided in it is correspondingly wedge-shaped as well, as is apparent from FIG. 4.

Not only forced feeding of the straw material to be pelletized is achieved with this measure, but a considerable feed pressure, which forces the material located in the said hollow space (34) to penetrate into the said shafts (51), is achieved as well.

In addition, it is clearly recognizable that the radial length of the said webs (39) and consequently also the radial length of the said shafts (51) located between them are substantially greater than the average thickness of the said webs (39) and of the said shafts (51). It can also be seen in FIG. 8 that the depth of penetration (52) of the said webs (39) into the said shafts (51) is relatively minimal.

The geometry of the said webs (39), whose specific design is shown in a preferred exemplary embodiment represented in FIG. 7, is such that the web edges (70) will not mutually touch each other during engagement. Instead, a small clearance is intentionally left between the said web edges (70). Consequently, the said webs (39) do not roll on one another, as it happens according to the state of the art.

However, the small clearance between the said web edges (70) also causes the straw material forcibly fed into their area to be shorn off and to be pressed into the said shafts (51) without any residues remaining.

To absorb the strong forces that occur, the said webs (39) in the exemplary embodiment according to FIG. 7 have wear bars (54) on the outer front side, which are fastened to the said webs by means of bolts (56). The said wear bars (54) are guided in grooves (84) with web projections (90) in order to prevent the pressing pressure from acting on the said bolts (56).

Figure 10:
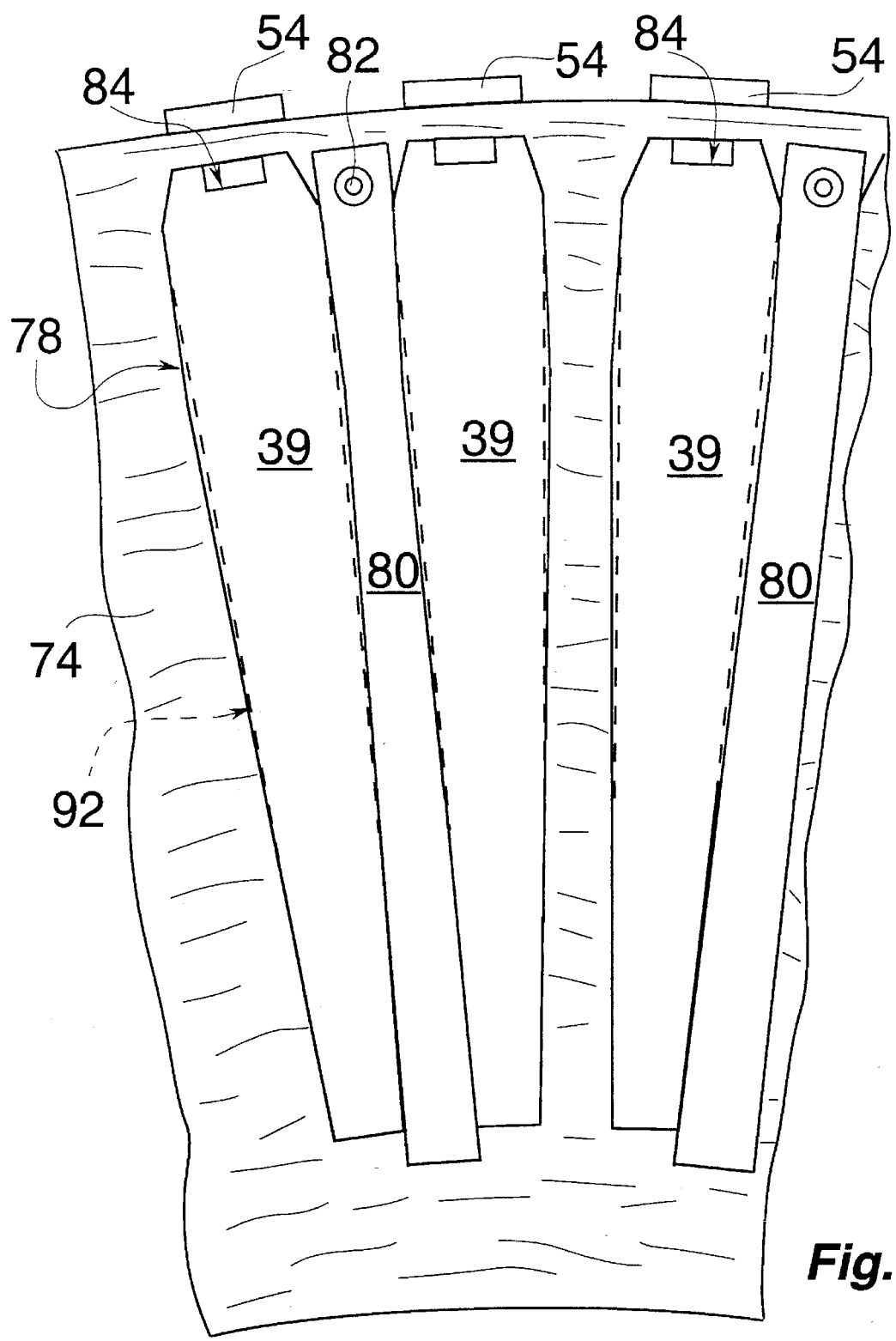
FIG. 10 shows a partial front view according to FIG. 9 with webs arranged and wedged in the recesses.

The said wear bar (54) expands in the shape of a parallelepiped at right angles to the plane of the drawing sheet. If, e.g., the representation in FIG. 10 is assumed to correspond to the actual size of a said web (39), the length of the said parallelepipedic wear bar (54) is approximately 100 mm.

As a result, a pressing channel (51), which is elongated in the axial direction and has an approximately rectangular cross section, is obtained, but the said pressing channel may also have a bulged shape.

The said individual web (39) has different thicknesses in the radial cross section according to FIG. 7. An undercut (64) is located opposite a wedge-shaped expansion (58) of the said web (39) directly behind the said wear bar (54). The said wedge-shaped expansion (58) is joined by an area (60) of constant thickness of the said web (39), which may also be designed as a slightly wedge-shaped web, after which the said web (39) passes over into a wedge-shaped tapered section (62). As is clearly apparent from FIGS. 6 and 8, the outer wall surfaces of the said webs (39) determine the shape of the said shafts (51) due to their radial arrangement on the said hollow body (33). Thus, there is first a slight wedge-shaped tapering of the said shafts (51) due to the said wear bars (54), and then there is a more intense wedge-shaped tapering of the said shafts (51) due to the wedge-shaped expansions (58). The areas (60) of constant thickness or of slight wedge-shaped expansion of the said webs (39) also lead to a decreasing, wedge-shaped tapering of the said shafts (51) in the radial direction as a consequence of the radial arrangement of the said webs (39).

Providing a zone of constant thickness in the area of the transition between a wedge-shaped thickening (60) and a wedge-shaped tapering (62) of the said web (39) in order to reduce the wear of the web walls at the edges of the said transitions has also proved to be advantageous. The said zones of constant thickness preferably have a low height of a few mm when viewed in the radial direction.

Whether the said shafts (51) have a constant width or a tapered section in the middle and radially inner area is obviously determined by the dimension of the said wedge-shaped tapered section (62) of the said webs (39). It proved to be advantageous in practice for the said shafts (51) to expand in a wedge-shaped pattern radially in the inward direction, while the length of the said area (62) of the said web (39) will be greater than half the radial length of the said web (39). The resulting expansion of the said pressing channel (51), which opens to the inside in a wedge-shaped pattern, causes the compacted strand, which slowly advances in the said pressing channel (51), not to be exposed to an increasing, but rather to a relieving friction, despite the tendency to swell and the degassing pressure.

Finally, FIG. 7 shows that it is recommended that radially inwardly extending longitudinal grooves (66) be arranged in the outer wall surfaces of the said webs (39).

The said longitudinal grooves (66) serve the purpose of allowing the gas pressure, which greatly increases during the compaction of the straw material, to escape. Therefore, the said longitudinal grooves (66) are also open on the inner front side.

A type of barb action, which hinders the material pressed in from exerting a considerable radial pressure in the outward direction in terms of a pressure relief, is brought about by the said above-mentioned undercut (64) between the said wedge-shaped expansion (58) and the said wear bar (54). On the other hand, the material pressed into the said pressing channel (51) is deflected by the said bevels (58) into a direction deviating from the radial direction, which leads to an arrow-like layer formation in the strand. If the pressed material is to be used as fuel, this offers the advantage that the individual pressed body will expand more readily under the action of heat, develops a larger surface offering access to oxygen, and thus leads to a higher heating efficiency.

All the measures described ultimately lead to the maintenance of the lowest possible friction between the material being guided in the pressed form through the said shafts (51) and the outer walls of the said webs (39), which contributes to achieving the maximum material throughput at a minimum energy consumption. It is therefore also recommended to design the outer surfaces of the said webs (39) with the lowest friction possible. As was described above in connection with FIGS. 2 and 3, the holes extending in the said webs (39) in parallel to the axis of rotation of the said hollow bodies (33) are intended to feed a heating agent to the immediate vicinity of the pressing members. Efficiency is optimal if the said webs are heated to temperatures higher than 150° C. and especially in the range of 165° C.

It was found in practice that the best pressing effect can be achieved when the exhaust gases of the said internal combustion engine (5) are passed through the said holes (72). Heating of the said webs (39) to approximately 165° C. can thus be achieved without the use of a separate heat source Based on a design of the said webs (39) corresponding to FIGS. 7 and 8, the compaction of the straw material is complete as soon as the material located in the said shafts (51) reaches the inner end of the said area (60) of constant web thickness. Nevertheless, the said webs (39) extend much longer in the radial direction, even though no more compaction is intended due to the said wedge-shaped tapered section (62) of the said webs (39).

The purpose of this measure is to ensure a longer residence time for the pressed straw material in the said shaft (51) and thus to initiate the hardening of the material.

However, this prolonged residence time must not lead to an increase in resistance, and the said wedge-shaped tapered section (62) and smoothing of the surface of the sid webs (39) is therefore preferred. The said longitudinal grooves (66) also make a substantial contribution to degassing and consequently to the reduction of friction.

Based on these considerations, the ratio of the said depth of penetration (52) of the said webs (39) or of the said wear bars (54) to the radial length of the said webs (39) is extremely different from the state of the art. The present invention proposed that this ratio be selected on the order of magnitude of more than 1:8 and especially in the range of 1:10 to 1:25.

The present invention also shows that the residence time of the pressed material in the shaft can also be optimized by reducing the flow rate of the heating medium in the said holes (72) of the said webs (39). This can be achieved by introducing, e.g., coils (77) or other flow obstacles into the said holes (72), as is shown in the example represented in FIGS. 7 and 13.

Figure 9:
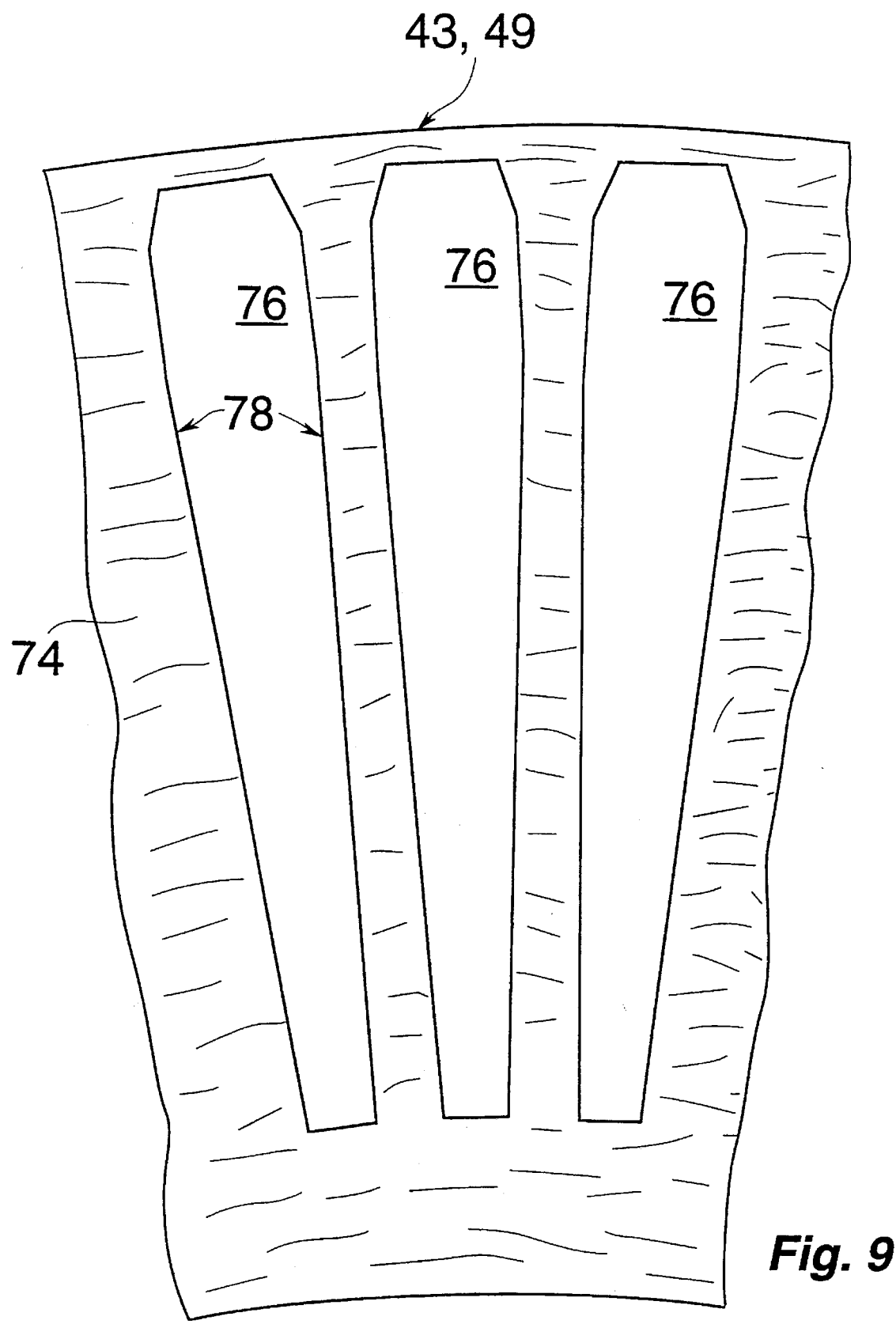
FIG. 9 shows a partial front view of a flange body with recesses provided in it.
Figure 11:
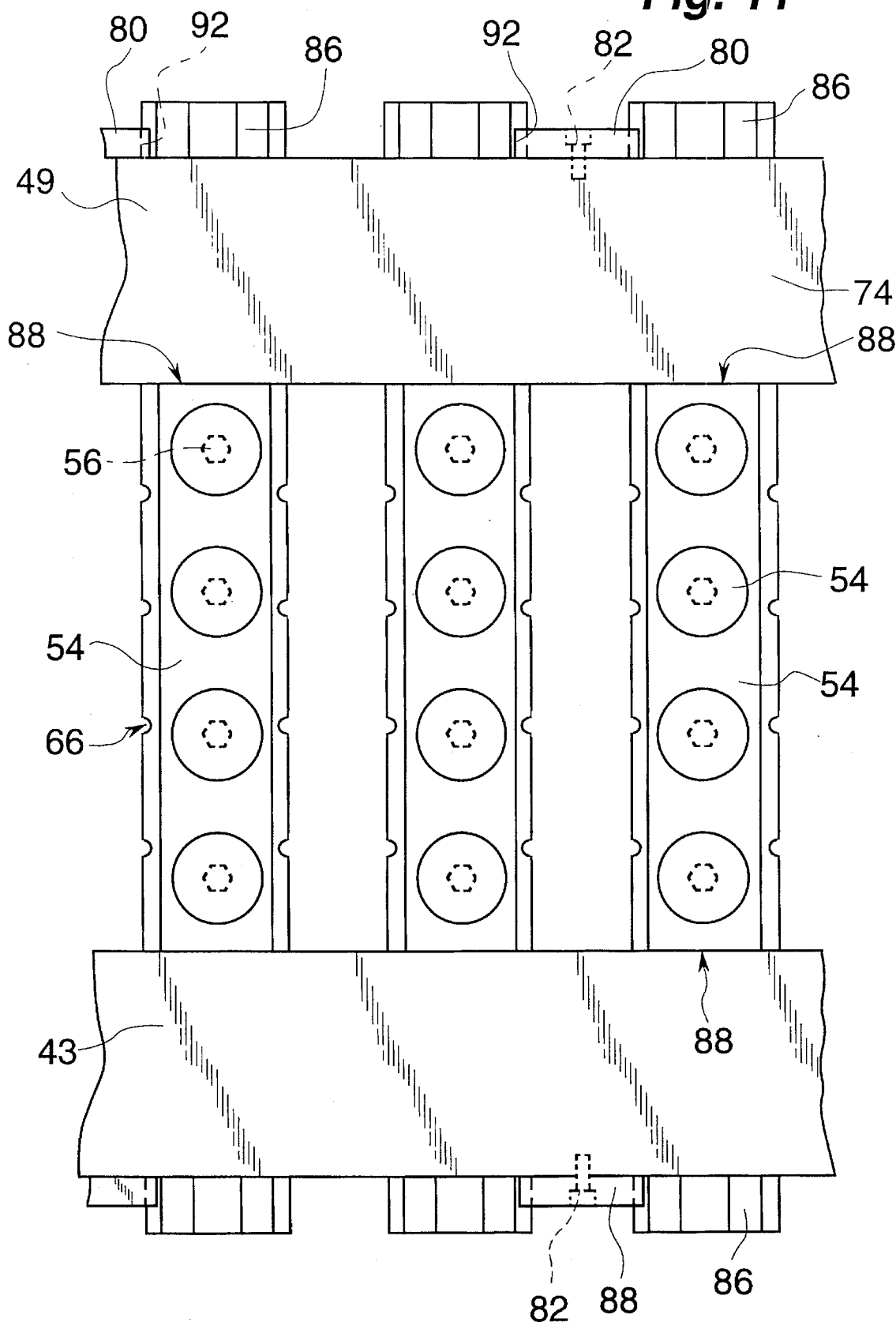
FIG. 11 shows a top view of the device according to FIG. 10.

FIGS. 9 through 11 show details of how the said webs (39) according to FIG. 7 can be connected to the said flange bodies (43) of the said hollow rolls (33), so that the possibility of replacement of the said webs is guaranteed, on the one hand, and, on the other hand, the especially strong forces occurring during pressing can be absorbed without the risk of breakage.

FIG. 9 shows in this connection the front view of a partial area of a cheek (74) of the said individual flange body (43). The said cheek (74) has regularly distributed recesses or perforations (76), which are intended to accommodate a said web (39) each, and possibly even a pair of adjacent webs (39), as is shown in FIG. 10. Thus, the edges (78) of the said recesses (76) determine the radial position of the said individual web (39), which is secured in this position against the said edges (78) by wedging by means of a strip (80) each. As is shown in FIG. 10, the said strip (80) needs to be fastened to the said cheek only with a bolt (82).

On their lateral wall surfaces, the said webs (39) have radially extending, groove-like milled slots (92), which are located directly opposite the said strips (80) in the installed state. Due to the profiling of the lateral wall surfaces of the said webs (39), the said milled slots (92) are present in some areas only. The said strips (80) engage the said milled slots (92) and thus form axially parallel stops on both sides of the said cheeks (74), thus preventing an axial mobility of the said webs (39) in the said cheeks (74).

As is also apparent from FIG. 10, the said wear bars (54) extend radially beyond the outer circumference of the said cheek (74).

As is apparent from the top view in FIG. 11, the said wear bars (54) have only a length corresponding to the distance of the said cheeks (74). This results in stops (88) which also bring about fixation of the said webs along the axis of the said hollow bodies (33) in relation to the said cheeks (74) of the said flange bodies (43, 49) as a consequence of the bolt connection (56) of the said wear bars (54) to the said webs (39).

Finally, the said webs (39) project with the projecting areas (86) above the outer surfaces of the said cheeks (74), which serves the purpose of enabling the said strips (80) to be arranged on the outside of the said cheeks (74) for wedging the said webs (39) and for acting against the said projecting areas (86).

Figure 12:
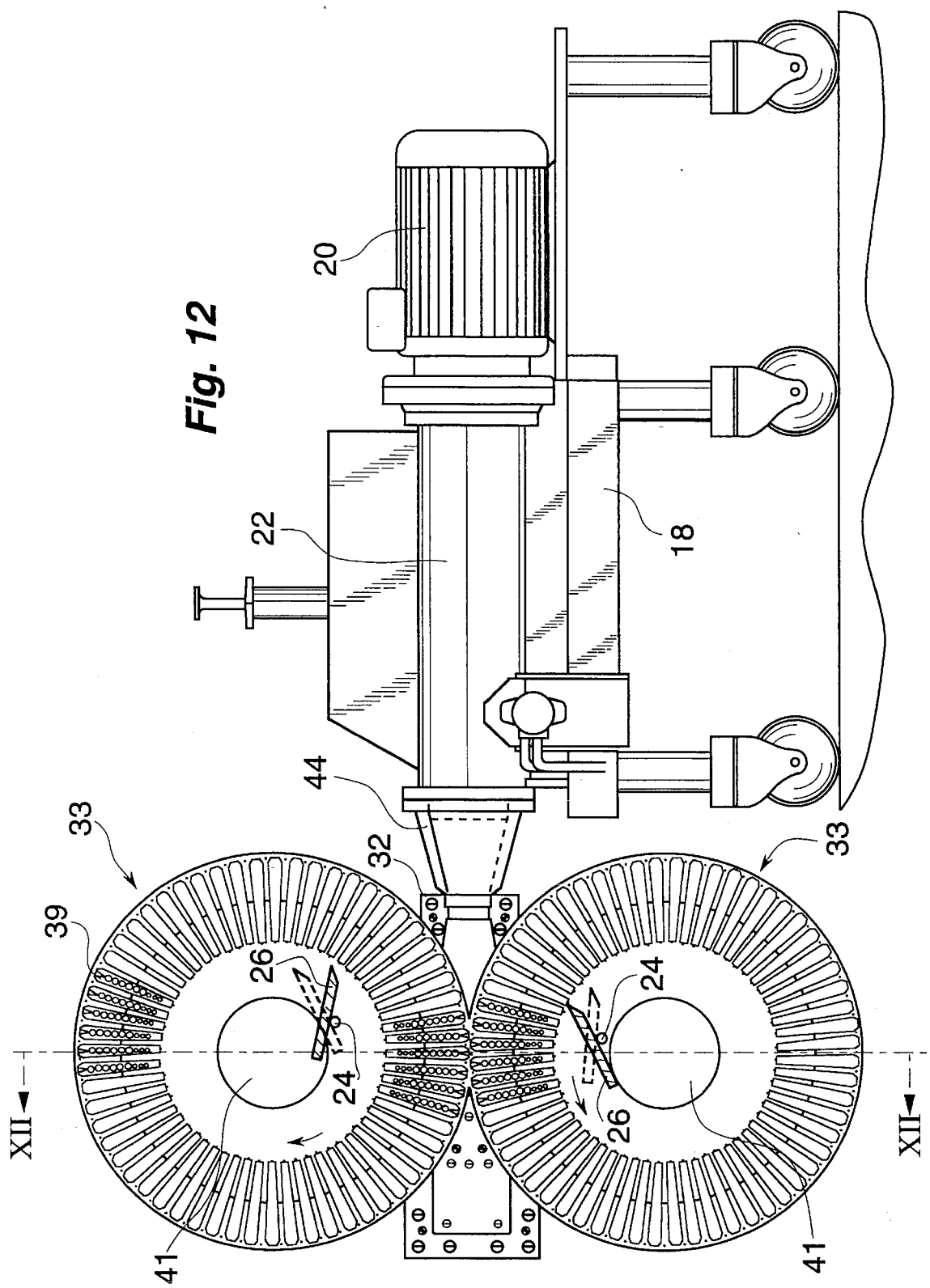
FIG. 12 shows a side view, partially in a sectional view, of a stationary pelletizing device.

As is shown in FIG. 12, the pelletizing device according to the present invention may also be arranged stationarily, instead of on a harvesting vehicle. The design of the said hollow rolls (33) corresponds to the exemplary embodiment according to FIG. 5. The said housing (27), not shown, may be arranged stationarily.

An electric motor (20), which drives a feed screw analogous to (15) in FIG. 1, is arranged on a movable frame (18). The straw material, which has been transported from the field and may have been crushed, is fed into the said conical worm housing (44) (cf. FIG. 6), in which a conical worm (48) for the forced transfer of the straw material to the said hollow rolls (33) is located.

Strippers (26), which act against the inner edges of the said webs (39) in the manner of a wiping blade and break off the compacted strands of straw material being discharged there, are located in the said hollow spaces (41) of the said hollow rolls (33).

If greater lengths of broken-off pressed bodies are desirable, the said stripper (26) must be brought out of the wiping position for a selectable period of time. This can be achieved, e.g., with an adjusting axle (24), to which the said stripper (26) is fastened. The distance between the said stripper (26) and the inner edge of the said webs (39) can be changed by rotating the said axle.

Figure 13:
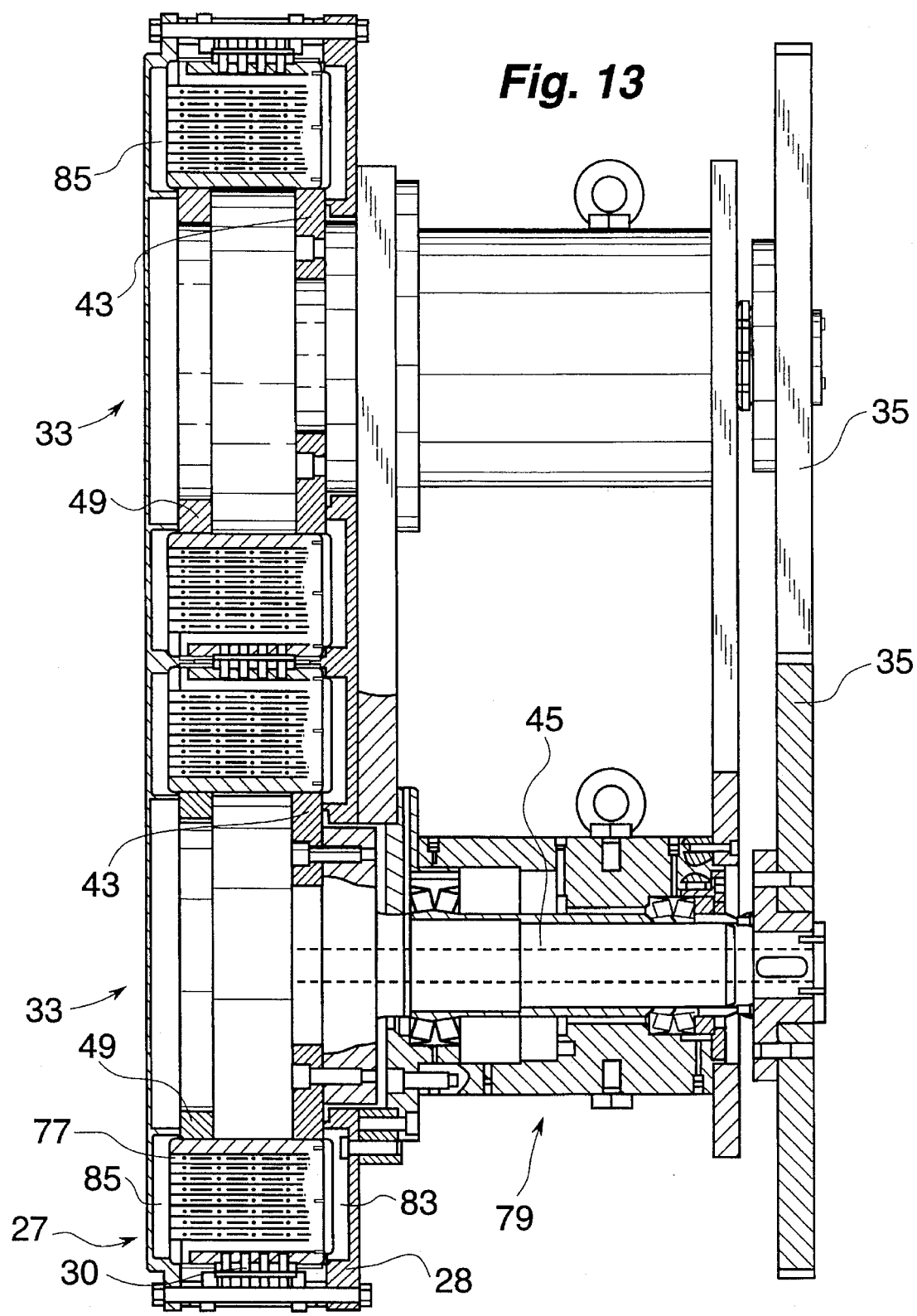
FIG. 13 shows a vertical section along line XIII—XIII through the pelletizing device according to FIG. 12.

The exemplary embodiment according to FIG. 13 shows, contrary to FIG. 3, a canthever mounting (79) of the said hollow bodies (33). The said bearing-side flange body (43) is rigidly connected to the said drive shaft (45). The said discharge-side flange body (49) is carried by the said flange body (43) via the plurality of said webs (39). The said housing (27) consists of the said housing frame (28) and the said housing shell (30), which are connected to one another via bolts (81) and surround the said webs (39). The said webs (39) are joined, on both sides, by chambers (83) and (85), which are intended to feed in and remove heating agents. For example, exhaust gases of an internal combustion engine can be passed through the said holes (72) of the said webs (39) in this simple manner.

To utilize the heat of the heating agent as completely as possible, it is recommended that elements, e.g., coils (77), be arranged in the said holes (72) of the said webs (39), which is to reduce the flow rate of the heating agent. Such coils (77) in a said hole (72) each are symbolically represented in FIGS. 7 and 13.

Figure 15:
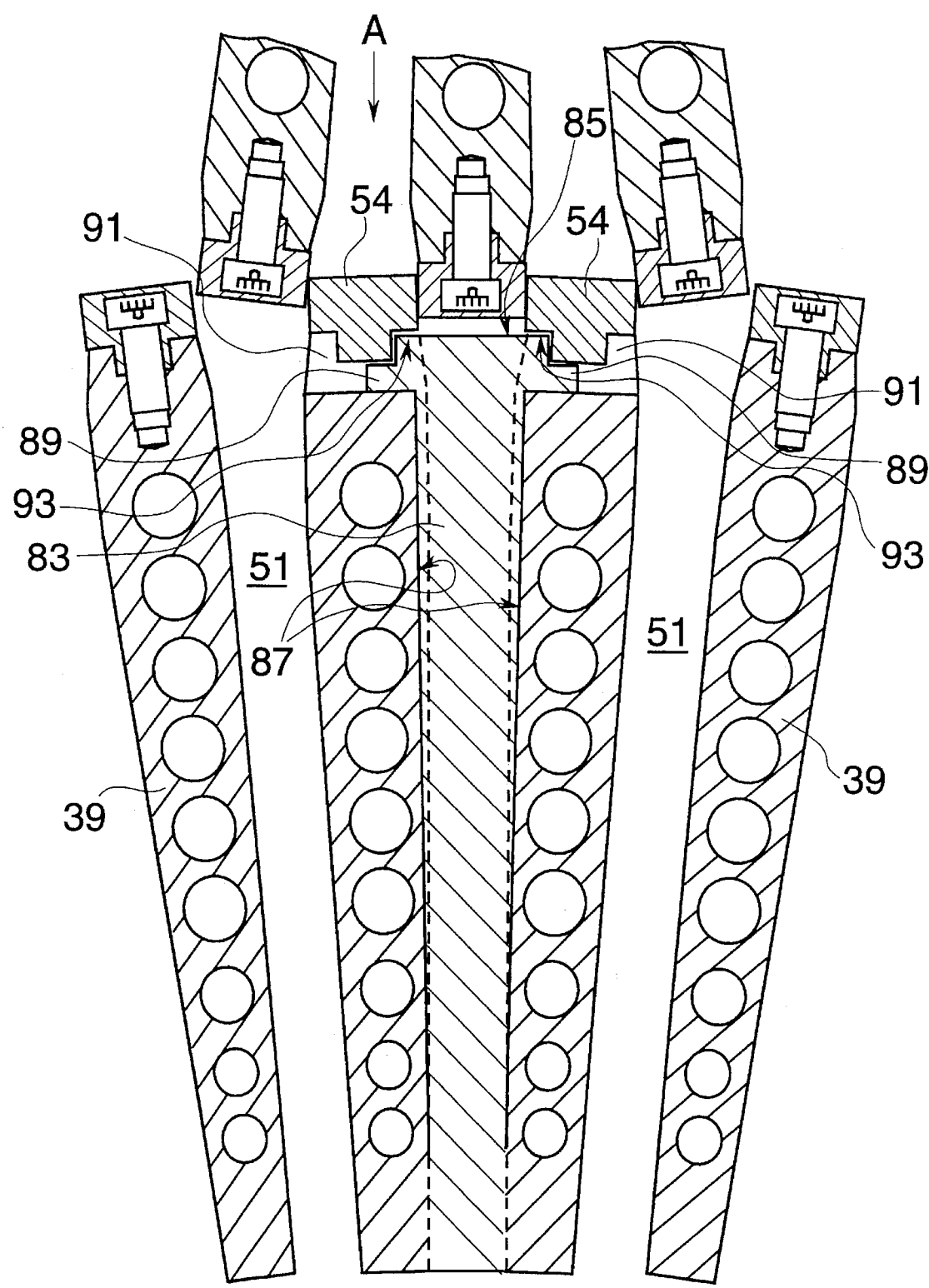
FIG. 15 shows a radial longitudinal section through a plurality of webs with partitions inserted between them.
Figure 17:
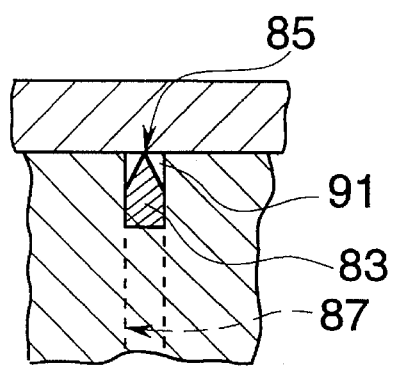
FIG. 17 shows a cross section through the partition according to line XVII—XVII according to FIG. 16.
Figure 16:
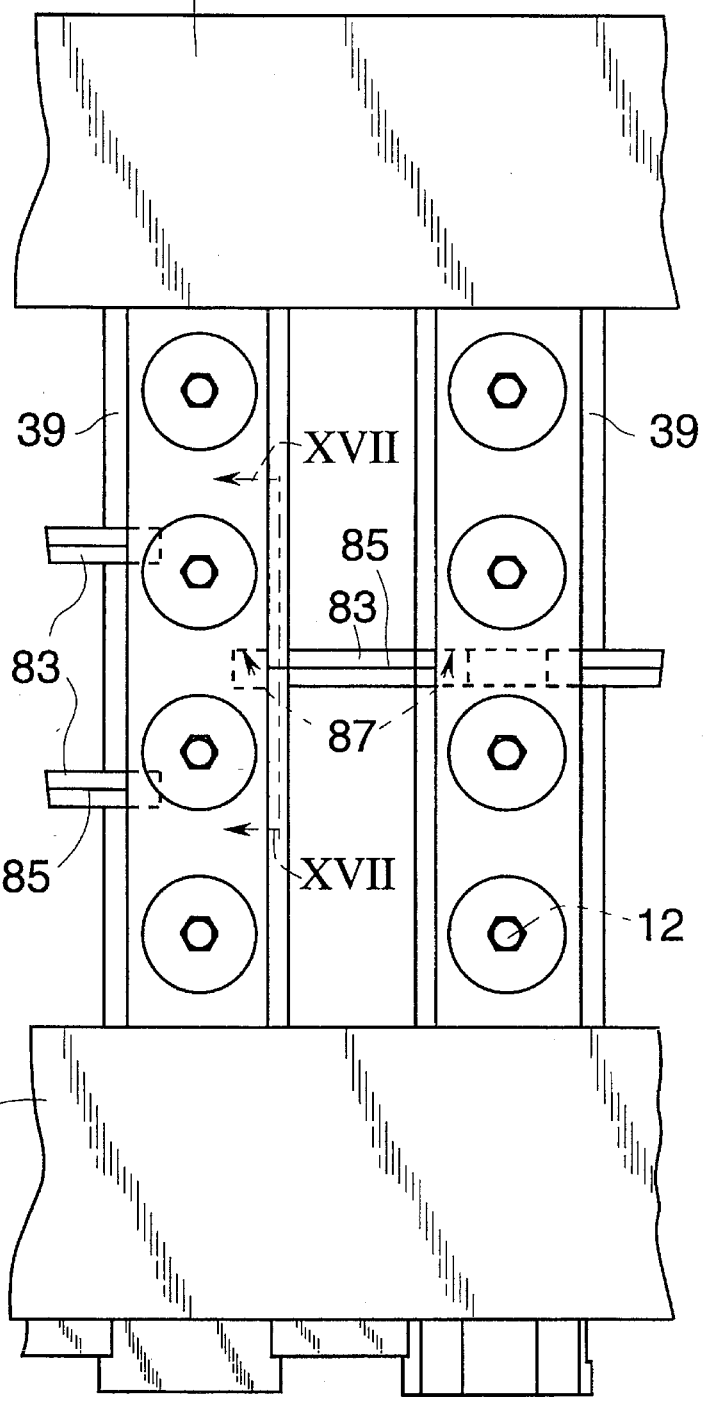
FIG. 16 shows a top view of a plurality of webs corresponding to arrow A in FIG. 15.

FIGS. 15 through 17 are linked with the exemplary embodiment according to FIG. 8, and they show an advantageous variant, which is not, however, dependent on the cross-sectional shape of the said webs.

To achieve the highest possible throughput and consequently a high efficiency, one seeks to maintain the length of the said webs (39) and consequently that of the said pressing channels (51), viewed in the axial direction of the said hollow rolls (33), as long as possible. Relatively broad strands will leave the said pressing channels (51) in this case, and when they are broken off, a granule size advantageous for the further processing is not necessarily ensured.

Figure 18:
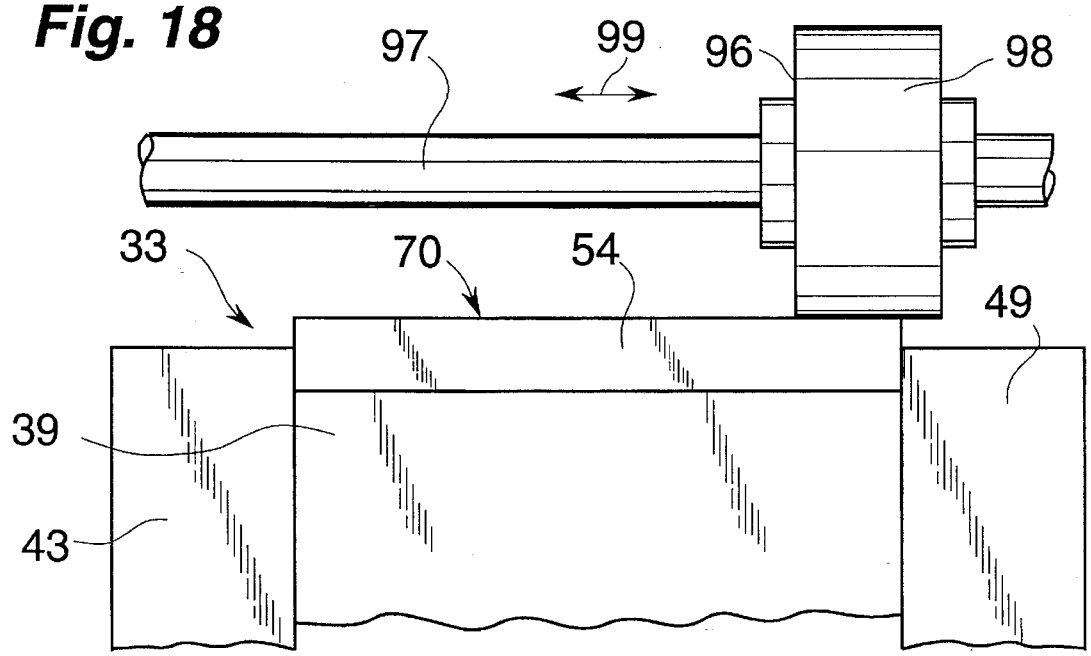
FIG. 18 shows a partial front view of a hollow roll with an oscillating grinding device.

Therefore, the example according to FIGS. 16 through 18 shows that the said pressing channels (51) are divided by partitions (83), which extend in radial planes in relation to the axis of the said hollow rolls (33) and pass transversely through the said pressing channels (51).

As can be recognized from FIG. 15, the said individual partition (83) has a wedge shape tapering from the outside to the inside in the axial view. As can be recognized from the representations in FIGS. 16 and 17, the cross section of the said partition (83) is prismatic, and especially rectangular. This makes it possible to guide the said partition (83) in grooves (87) of the said webs (39), which are located opposite each other.

It is shown in the example represented in FIG. 16 that the said individual pressing channel (51) may be divided either by a said single partition (83) or by two or more said partitions (83). FIG. 16 also shows symbolically that the said webs (39) are guided in the said flange bodies (43, 49), which form the said hollow rolls (33) together with the said webs (39).

In the outer front area, the said individual partition (83) has a preferably ridge-like cutting edge (85), which may be formed by beveling the said partition (83) corresponding to the exemplary embodiment shown in FIG. 17. The said cutting edge (85) has the task of reducing the resistance of the said partition (83) to the pressing pressure which is generated by the said individual webs (39) during the stuffing of the vegetable material into the said pressing channels (51). A division of the said pressing channels (51) and consequently of the strands compacted into the said pressing channels (51) is thus achieved, which leads to a reduction in the width of the granules to be formed.

The position of the said individual partition (83) must be secured in order to prevent it from becoming mobile under the influence of the pressing pressure. To achieve this, the said individual partition has hammer head-like projections (89), which engage grooves (91) of the said webs (39) (compare FIG. 15). The said grooves extend in the circumferential direction in relation to the movement of the said webs (39). The said individual partition (83) is consequently supported on the bottom of the said groove (91) under the effect of the pressing pressure. In the other direction, the said partition (83) or the said individual hammer head-like projection (89) is decelerated by a stop surface (93) of a said wear bar (54), which forms the actual cutting edges of the said web (39). As is shown in FIG. 17, the said wear bars (54) are attached to the front surfaces of the said webs (39) by means of bolts (94).

The insertion and removal of the said individual partitions (83) is thus facilitated, because only the said wear bars (54) are to be bolted on.

As is shown in FIG. 16, the said cutting edge (85) extends only between the side surfaces of the said wear bars (54) facing each other. Lateral channels are thus prevented from being formed due to the bevel along the stop surface. The said cutting edge (85) is aligned with the laterally adjacent front surfaces of the said partition (83).

FIG. 18 shows symbolically a grinding device (96), which can be moved to and fro in parallel to the axis of the said individual hollow roll (33) and consequently along the said cutting edge (70) of the said individual web (39) or its said wear bar (54). To achieve this, a grinding roller (98), driven to perform rotary movements, is occasionally moved to and fro along the arrow (99) on an axially parallel axis (97). The said grinding roller smoothes the circumferential surface of the said wear bar (54) and thus sharpens the said cutting edge or web edge (70).

LIST OF REFERENCE NUMERALS

1 Driver's cabin
2 Harvester
3 Wheel
4 Pickup device
5 Internal combustion engine
6 Side feed screw
7 Mowing tool 8 Feed prongs
9 Slope conveyor
10 Intake area
11 Vertical conveyor
12 Pressing device
13 Fine crushing mechanism (guide roller)
14 Cutting knife
15 Trough screw
16 Elevator
17 Pressure worm
18 Frame
19 Pelletizing device
20 Electric motor
21 Silo
23 Heat exchanger
24 Adjusting axle
25 Connection line
26 Stripper
27 Housing
28 Housing frame
29 Bearing
30 Housing shell
31 Bearing
32 Housing connection
33 Hollow roll (hollow wheel)
34 Hollow space expanding in the shape of a wedge
35 Gear transmission
36 Wedge-shaped component
37 Drive shaft
38 Outer surface
39 Web
40 Minimum clearance
41 Hollow space
42 Maximum clearance
43 Flange body
44 Worm housing
45 Axle journal
46 Hollow space tapering in the shape of a wedge
47 Outlet opening
48 Wedge-shaped pressure worm
49 Flange body
50 Radial length
51 Pressing channel (shaft)
52 Depth of penetration
53 Crushing cone
54 Wear bar
55 Radial guide plate
56 Bolt
57 Heating agent channel
58 Wedge-shaped expansion
59 Rotary liquid coupling
60 Area of constant thickness
61 Housing
62 Wedge-shaped tapered section
63 Housing area
64 Undercut
65 Heating agent channel
66 Longitudinal groove
67 Repressing roller
68 Open outlet
69 Repressing roller
70 Web edge
71 Die
72 Heating agent hole
73 Direction of rotation
74 Cheek of flange body
75 Housing halves
76 Recess
77 Coil
78 Edge
79 Canthever mounting
80 Strip
81 Bolt
82 Screw
83 Partition
84 Groove
85 Cutting edge
86 Projecting area
87 Groove
88 Stop
89 Hammer head-like projection
90 Web projection
91 Groove
92 Milled slot
93 Stop surface
94 Screw
95 Arrow
96 Grinding device
97 Axis
98 Grinding roller
99 Arrow
131 Housing
133 Conical pressing space
135 Conical worm
137 Worm outlet
139 Die pipe
143 Heating agent channel

I claim:

1. Device for pelletizing the vegetable material, comprising:

a first hollow roll and a second hollow roll mounted parallel to one another, said first hollow roll and second hollow roll being forcibly driven in opposite directions in relation to one another, each of said first hollow roll and said second hollow roll having separate and spaced webs, adjacent webs of each hollow roll defining a pressing channel therebetween, each pressing channel having an axial dimension substantially equal to an axial dimension of said adjacent webs at each radial position of said pressing channel and said adjacent webs, each pressing channel leading radially to a hollow roll interior with each pressing channel having a portion tapering radially in an inward direction, said hollow rolls having an intake side;

feed screw means for feeding material to said intake side wedge between a circumference of said hollow rolls, said webs each being formed elongated in a radial and an axial direction, said webs being individually connected at axial ends of said webs to flange bodies arranged coaxially and at spaced locations from one another;

heat means for heating said webs, said webs having axially parallel holes for connection to heating agent lines;

and a housing surrounding said first and second rolls, whereby rotation of said first and second rolls causes material fed to said intake via said feed screw to be compacted through said radial pressing channels, to be broken off in said interior of said hollow rolls and to be removed from said interior in an axial direction, said housing having heating agent channels connected to said heat means;

a stripper means positioned inside said first and second hollow rolls and for breaking off material from an inner radial end of said webs, said first and second roll defining an outlet opening for discharge of the material broken off by said stripper means.

2. Device in accordance with claim 1, wherein said webs are detachably connected to said flange bodies.

3. Device in accordance with claim 1, wherein said pelletizing device is connected to a self-propelled harvester, said harvester including means for mowing vegetable material, means for picking up vegetable material, means for crushing and conveying vegetable material and means for storing pellets after pelletizing the vegetable material.

4. Device in accordance with claim 1, wherein:
one of said webs and said housing includes waste heat means for distributing waste heat of an internal combustion engine of said harvester, said waste heat means including a connection to a cooling circuit of said internal combustion engine.

5. Device in accordance with claim 1, wherein one of said said webs and said housing include means for heating to at least 100° C. and preferably to more than 150° C.

6. Device in accordance with claim 1, wherein said webs and said housing can be heated with the exhaust gases of an internal combustion engine.

7. Device in accordance with claim 1, wherein flow rate of the heating agent in said holes can be reduced by resistance elements, e.g., coils.

8. Device in accordance with claim 1, wherein a radial length of said webs is substantially greater than a depth of penetration of said webs (39) into said associated shafts (51).

9. Device in accordance with claim 8, wherein the ratio of said depth of penetration to said radial web length is on the order of magnitude of more than 1:8 and preferably 1:10 to 1:25.

10. Device in accordance with claim 9, wherein said individual wear bar is parallelepipedic.

11. Device in accordance with claim 1, wherein web front areas penetrate into said shafts in a contactless manner.

12. Device in accordance with claim 1, wherein a clearance expanding in the direction of movement of the webs is provided between the inner surface of the housing and the outermost path of rotation of said webs.

13. Device in accordance with claim 12, wherein said clearance expands to a thickness on the order of magnitude of ca. 1 mm.

14. Device in accordance with claim 1, wherein outer front area of said webs is designed as a wear bar and is detachably connected, especially bolted to said webs.

15. Device in accordance with claim 14, wherein said wear bars radially project over the outer circumference of said flange bodies and extend as axial distance elements in the area between said cheeks of said flange bodies.

16. Device in accordance with claim 1, wherein said individual web has different thicknesses over its radial length; that said web first expands more markedly in a wedge-shaped manner and then it expands less markedly in a wedge-shaped manner radially from the outside to the inside, after which it tapers in a wedge-shaped pattern.

17. Device in accordance with claim 16, wherein the length of said wedge-shaped tapered section of said web is greater than half said web length, and the pressing channel has a radially inwardly extending, wedge-shaped expansion in the area between the said wedge-shaped tapered sections.

18. Device in accordance with claim 16, wherein a wedge-shaped expansion (59) of said web begins with a step-like undercut behind said wear bar.

19. Device in accordance with claim 1, wherein radially extending longitudinal grooves are provided in the outer surfaces of the webs.

20. Device in accordance with claim 1, wherein said web is guided in fittingly designed recesses of cheeks of said flange bodies and are secured with wedges against the recess wall surfaces by means of strips extending radially between said webs.

21. Device in accordance with claim 20, wherein said strips engage lateral milled slots of said webs.

22. Device in accordance with claim 1, wherein said housing surrounding said hollow rolls has a connection on the intake side for a housing of an especially conical pressure worm, which acts in the circumferential direction of said meshing hollow rolls.

23. Device in accordance with claim 22, wherein said housing accommodating said pressure worm conically tapers in the direction of feed, and that said hollow space of said connection subsequently expands in the direction of feed.

24. Device in accordance with claim 1, wherein said housing includes a wedge-shaped component with an outer surface which is in sliding frictional contact with outer surfaces of said webs, said wedge-shaped component extending into said discharge side of said rolls.

25. Device in accordance with claim 1, wherein said feed screw and said webs cooperate to produce a press material in said pressing channels which press material has a density on the order of magnitude of 0.8 to 1.2 g/cm$^3$.

26. Device in accordance with claim 1, wherein said stripper is designed as a shearing-off device that can be engaged and disengaged.

27. Device in accordance with claim 1, wherein a device for measuring the moisture content in the straw material, as well as a device controlled by it for adding moisture are provided.

28. Device in accordance with claim 1, wherein a pressing device is arranged directly behind a side feed screw of a pickup or mowing device in a front area of a self-propelled harvester.

29. Device in accordance with claim 28, wherein said pressing device is designed as a replaceable structural unit.

30. Device in accordance with claim 28, further comprising cutting knives, on which the material to be compacted is comminuted, said cutting knives extending into a path of feed of feed prongs.

31. Device in accordance with claim 28, wherein said pickup device, said side feed screw, and said pressing device are integrated as one structural unit.

32. Device in accordance with claim 31, wherein said structural unit is, connected to a traveling gear and drive unit via quickcoupling elements.

33. Device in accordance with claim 1, wherein a grinding device is provided movable to and fro along a knife edges of said webs.

34. Device for pelletizing the vegetable material, comprising:
a first hollow roll and a second hollow roll mounted parallel to one another, said first hollow roll and second hollow roll being forcibly driven in opposite directions in relation to one another, each of said first hollow roll and said second hollow roll having webs, adjacent webs of each hollow roll defining a pressing channel therebetween, each pressing channel leading radially to a hollow roll interior with each pressing channel having a portion tapering radially in an inward direction, said hollow rolls having an intake side;

feed screw means for feeding material to said intake side of said hollow rolls, said webs each being formed elongated in a radial and an axial direction, said webs being connected to flange bodies arranged coaxially and at spaced locations from one another;

heat means for heating said webs;

and a housing, whereby rotation of said first and second rolls causes material fed to said intake via said feed screw to be contacted through said radial pressing channels, to be broken off in said interior of said hollow rolls and to be removed from said interior in an axial direction.

a partition traversing said individual pressing channel and arranged at right angles to the axis of rotation, said partition is guided on an outside of adjacent webs facing each other, and said partition has an outer front side with a cutting edge.

35. Device in accordance with claim 34, wherein said partition has a rectangular cross section and is guided in radially extending, mutually opposite grooves of said webs.

36. Device in accordance with claim 34, wherein said partition is supported by stops on said webs in the radial direction.

37. Device in accordance with claim 36, wherein said partition has, on its outer front area, hammer head-like projections (89), which engage said grooves of said webs, which extend on the outside of the webs in the circumferential direction, in relation to the path of movement of said webs.

38. Device in accordance with claim 36, wherein a wear bar closing off said web on an outside is provided as a stop, against a radially outwardly directed movement of said partition.

39. Device in accordance with claim 34, wherein said cutting edge is designed as a ridge and extends only between lateral surfaces of said wear bars facing each other.

40. Device in accordance with claim 34, wherein a broad side of said partition is designed as a partition tapering toward the inside in a wedge-shaped manner.

41. Device for pelletizing material, the device comprising:

a housing;

feed means positioned in said housing for feeding material;

a first roll rotatably mounted in said housing and including a plurality of first webs, said plurality of first webs extending in a radial direction of said first roll and defining a plurality of first pressing channels;

heat means for heating said plurality of first webs;

a second roll rotatably mounted in said housing and including a plurality of second webs, said plurality of second webs extending in a radial direction of said second roll and defining a plurality of second pressing channels, each of said second pressing channels having an axial dimension substantially equal to an axial dimension of adjacent said second webs at each radial position of said second pressing channels and said adjacent second webs, said second roll being positioned to have said first webs engage with said second pressing channels to form an engagement means during rotation of said first and second rolls in opposite directions, said engagement means for receiving the material from said feed means and for compressing the received material.

42. A device in accordance with claim 41, wherein:

said webs of said first and second rolls are separate and spaced from each other;

said pressing channels narrow radially inward and extend to a hollow space defined by said first and second rolls;

said first and second rolls include flange bodies, said webs being individually connected to said flange bodies at axial ends of said webs;

said housing surrounding said first and second rolls;

said heat means also heating said housing, said heat means including a plurality of heating agent channels defined by said webs and said housing;

said first and second rolls and said housing forming an intake side wedge area, and said feed means being positioned at said intake side wedge area;

said first and second rolls defining an outlet opening for discharge of material from said first and second rolls.

43. A device in accordance with claim 41, wherein:

a stripper means is positioned in said first and second rolls and is for breaking off material from an inner radial edge of said webs, said stripper including a wiper blade acting against said inner radial edge of said webs.

44. A device in accordance with claim 41, wherein:

said heat means heats said plurality of first webs to a temperature to reduce pressing forces used to compact the material.

45. A device in accordance with claim 41, further comprising:

partition means positioned in said second pressing channels and for dividing the compacted material into smaller sizes, said partition means being shaped to maximize dividing of the compacted material and minimize compaction resistance.

* * * * *